US008539466B2

(12) United States Patent
Abadi et al.

(10) Patent No.: US 8,539,466 B2
(45) Date of Patent: Sep. 17, 2013

(54) DETERMINING SUITABLE INSERTION POINTS FOR STRING SANITIZERS IN A COMPUTER CODE

(75) Inventors: Aharon Abadi, Eilat (IL); Jonathan Bnayahu, Haifa (IL); Ran Ettinger, Tel-Aviv (IL); Yishai Abraham Feldman, Tel-Aviv (IL); Yinnon Avraham Haviv, Beerotaim (IL); Adi Sharabani, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 13/113,097

(22) Filed: May 23, 2011

(65) Prior Publication Data

US 2012/0304161 A1 Nov. 29, 2012

(51) Int. Cl.
*G06F 9/45* (2006.01)

(52) U.S. Cl.
USPC .......................................... 717/156; 717/155

(58) Field of Classification Search
USPC ................................................ 717/154–156
See application file for complete search history.

(56) References Cited

U.S. PATENT DOCUMENTS

| 3,629,005 | A | 12/1971 | Belden |
| 4,585,119 | A | 4/1986 | Boyington |
| 4,620,502 | A | 11/1986 | Kimble |
| 6,099,813 | A | 8/2000 | Gipson |
| 6,931,132 | B2 | 8/2005 | Billhartz et al. |
| 6,952,779 | B1 | 10/2005 | Cohen et al. |
| 7,322,465 | B2 | 1/2008 | Harper |
| 7,343,599 | B2 | 3/2008 | Panjwani |
| 7,346,167 | B2 | 3/2008 | Billhartz et al. |
| 7,530,107 | B1 | 5/2009 | Ono et al. |
| 7,617,489 | B2 | 11/2009 | Peyton et al. |
| 8,347,088 | B2 * | 1/2013 | Moore et al. .................. 713/166 |
| 2002/0165942 | A1 * | 11/2002 | Ulrich et al. .................. 709/219 |
| 2007/0240138 | A1 | 10/2007 | Chess et al. |
| 2010/0043048 | A1 | 2/2010 | Dolby et al. |
| 2010/0083240 | A1 | 4/2010 | Siman |

OTHER PUBLICATIONS

"SQL injection" From Wikipedia, the free encyclopedia URL: http://en.wikipedia.org/wiki/SQL_injection, last printed Jul. 28, 2010.
"Secure Coding Guidelines for the Java Programming Language, Version 3.0", Version 3.0—Sun Development. URL: http://java.sun.com/security/seccodeguide.html. last printed Jul. 28, 2010.
"RsMonials, fixing the security vulnerabilities", Sankuru, URL: http://sankuru.biz/en/blog/9-joomla-source-code-hacks/32-rsmonials-fixing-the-security, Last printed Jul. 28, 2010.
Microsoft Research, "Specification Inference for Security" URL: URL:http://community.research.microsoft.com/blogs/techfestlive/archive/2009/02/26/specification-inference-for-security.aspx, Last printed Jul. 28, 2010.
Jin-Cherng Lin and Jan-Min Chen, "An automated mechanism for secure input handling", Journal of Computers, vol. 4, No. 9, Sep. 2009.
US 7,752,177, 07/2010, Bronnikov et al. (withdrawn)

* cited by examiner

*Primary Examiner* — Anna Deng

(57) ABSTRACT

A method of determining suitable insertion points for inserting string sanitizers in a computer code is provided herein. The method includes the following stages: obtaining: (i) a computer code associated with a data flow of externally supplied data, from one or more sources to one or more sinks, (ii) locations of the sources, and (iii) locations of the sinks; building a graph representing control paths, data paths and semantic relationships between the control paths and the data paths of the computer code; associating all tainted data paths on the graph, being data paths that go from sources to sinks and do not include a sanitizer; and determining, on the tainted data paths, potential control paths suitable for sanitizer insertion.

20 Claims, 8 Drawing Sheets

```
PROTECTED READER GETRTFREADER(HTTPSERVLETREQUEST REQUEST, HTTPSERVLETRESPONSE RESPONSE) THROWS EXCEPTION {
411  STRING RTFMODELNAME = REQUEST.GETPARAMETER("MODELNAME");
     IF (!RTFMODELNAME.ENDSWITH(".RTF"))  412
                RTFMODELNAME = RTFMODELNAME + ".RTF";
415  STRING RTFMODELPATH = REQUEST.GETREALPATH("") + "/RTF/" + RTFMODELNAME;  413
     READER RTFMODELREADER = NEW FILEREADER(NEW FILE(RTFMODELPATH));  414
416
}
```
410

Figure 4A

```
PROTECTED READER GETRTFREADER(HTTPSERVLETREQUEST REQUEST, HTTPSERVLETRESPONSE RESPONSE) THROWS EXCEPTION {
     STRING RTFMODELNAME = REQUEST.GETPARAMETER("MODELNAME");
     IF (!RTFMODELNAME.ENDSWITH(".RTF"))
          RTFMODELNAME = ENCODE(RTFMODELNAME) + ".RTF";   421
     ELSE
          RTFMODELNAME = ENCODE(RTFMODELNAME);   422
     STRING RTFMODELPATH = REQUEST.GETREALPATH("") + "/RTF/" + RTFMODELNAME;
     READER RTFMODELREADER = NEW FILEREADER(NEW FILE(RTFMODELPATH));
}
```
420

Figure 4B

```
PROTECTED READER GETRTFREADER(HTTPSERVLETREQUEST REQUEST, HTTPSERVLETRESPONSE RESPONSE) THROWS EXCEPTION {
     STRING RTFMODELNAME = REQUEST.GETPARAMETER("MODELNAME");
     STRING NEWRTFMODELNAME = ENCODE(RTFMODELNAME);   431
     IF (!RTFMODELNAME.ENDSWITH(".RTF"))
          RTFMODELNAME = NEWRTFMODELNAME + ".RTF";   432
     ELSE
          RTFMODELNAME = NEWRTFMODELNAME;   433
     STRING RTFMODELPATH = REQUEST.GETREALPATH("") + "/RTF/" + RTFMODELNAME;
     READER RTFMODELREADER = NEW FILEREADER(NEW FILE(RTFMODELPATH));
}
```
430

Figure 4C

```
VOID H()
  F2();
}
VOID G()
  F3(NULL);
}
VOID F2()
  STRING RTFMODELNAME = REQUEST.GETPARAMETER("MODELNAME");  ⟵ 611
  IF (!RTFMODELNAME.ENDSWITH(".RTF"))
    RTFMODELNAME = RTFMODELNAME + ".RTF";   ⟵ 612
                    613    614   615
  F3(RTFMODELNAME);
}
VOID F3(STRING RTFMODELNAME)
  IF (RTFMODELNAME == NULL)
    RTFMODELNAME = "DEFAULT.RTF";
                                                    616
  GETRTFREADER(RTFMODELNAME);
}
                                      610
```

Figure 6A

```
                                  619
PROTECTED READER GETRTFREADER(STRING RTFMODELNAME) THROWS EXCEPTION {   ⟵ 618
  STRING RTFMODELPATH = REQUEST.GETREALPATH() + "/RTF/" + RTFMODELNAME;
  READER RTFMODELREADER = NEW FILEREADER(NEW FILE(RTFMODELPATH));
                                                          617          619A
}
VOID F2()
  STRING RTFMODELNAME = REQUEST.GETPARAMETER("MODELNAME");
  IF (!RTFMODELNAME.ENDSWITH(".RTF"))
    RTFMODELNAME = ENCODE(RTFMODELNAME) + ".RTF";   ⟵ 621
  ELSE
    RTFMODELNAME = ENCODE(RTFMODELNAME);   ⟵ 622
  F3(RTFMODELNAME);
}
                                      620
```

Figure 6B

DETERMINING SUITABLE INSERTION POINTS FOR STRING SANITIZERS IN A COMPUTER CODE

BACKGROUND

1. Technical Field

The present invention relates to amending security vulnerabilities in a computer code and more particularly, to doing so using string sanitizers.

2. Discussion of the Related Art

Security vulnerabilities of computer codes pose well known challenges for security experts. Data entered to a computerized system by a human user or any other external source may deliberately or accidentally cause harmful consequences. Security experts may, in a time consuming and not always efficient process, analyze a given code in search of these security vulnerabilities in order to amend them usually on an ad hoc basis, where each one of the security vulnerabilities needs to be addressed and amended differently.

Several analysis tools are known in the art, as well as academic attempts addressing the security vulnerabilities issues of computer codes. However, these attempts are drawn to static computer code analysis for security in which a computer code is scanned by a static analyzer, based on a set of security rules, and candidate vulnerabilities detected by the tool are reported to the user.

In some of the industry known tools, such as IBM's AppScan DE and Fortify's Source Code Analyzer, each report is accompanied by generic remediation information, which proposes ways in which the developer may amend the code so as to remove the reported vulnerability. However, these suggestions are of a very general nature, and the developer needs to further adapt them to the specific situation manually on a case by case basis. Specifically, in cases where the solution requires inserting a call to a string sanitizer, one of the main challenges is to find the most appropriate location in the computer code to insert that call. The use of string sanitizers and the need to determine an optimal location for them is typical in security vulnerabilities such as Log Forging, Cross-Site Scripting (XSS), Path Traversals, and the like.

BRIEF SUMMARY

One aspect of the present invention provides a method of determining suitable insertion points for string sanitizers in a computer code. The method includes the following stages: obtaining: (i) a computer code associated with a data flow of externally supplied data, from at least one source to at least one sink, (ii) at least one of the sources, and (iii) at least one of the sinks; building a graph representing control paths, data paths and semantic relationships between the control paths and the data paths of the computer code; identifying all tainted data paths on the graph, being data paths that go from sources to sinks and do not include a sanitizer; and determining, on the tainted data paths, potential control paths suitable for sanitizer insertion.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 4A-4C are exemplary code portions illustrating an aspect according to some embodiments of the invention;

FIGS. 6A and 6B are exemplary code portions illustrating an aspect according to some embodiments of the invention.

Figure 1:
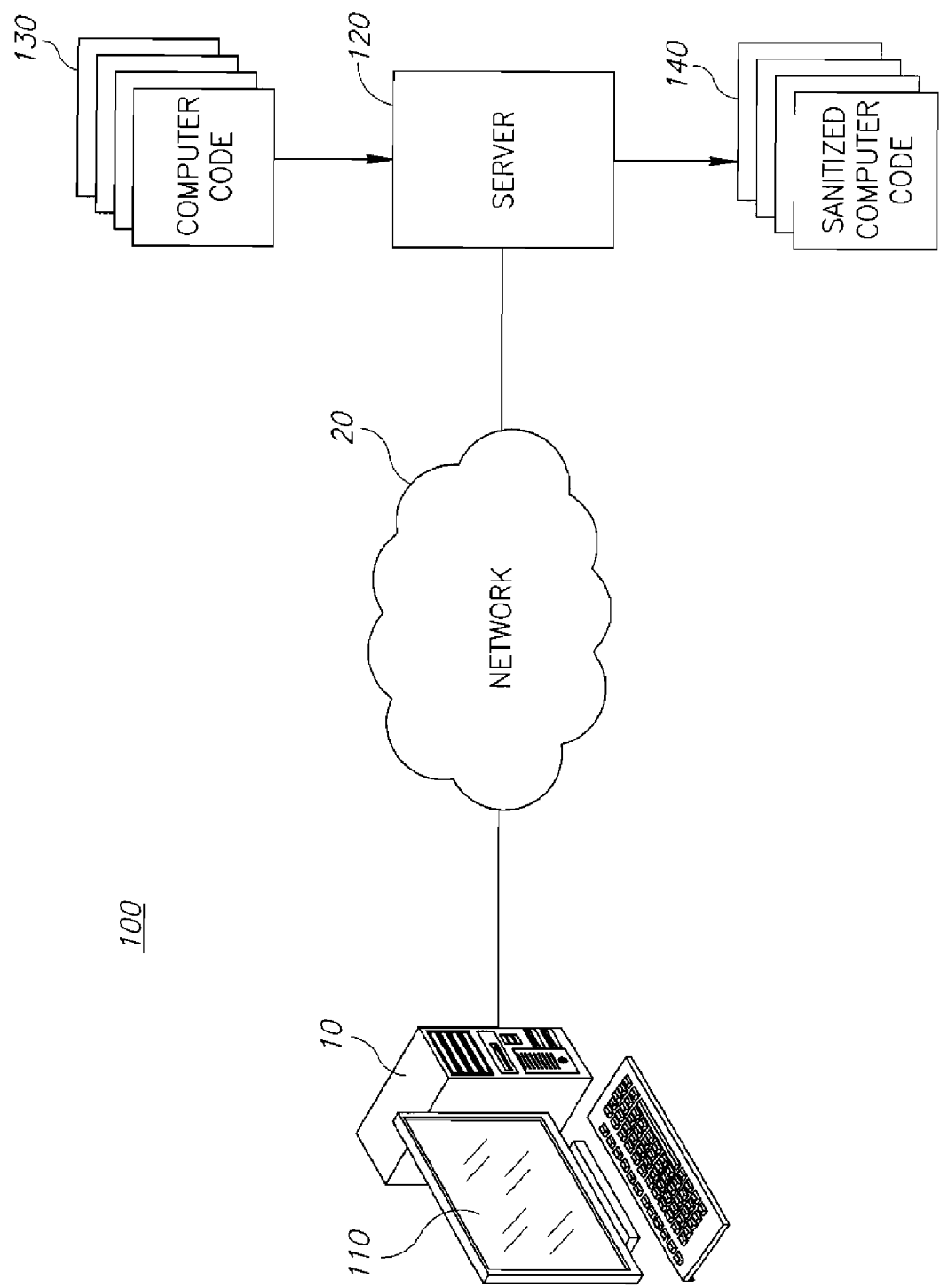
FIG. 1 is a high level schematic block diagram illustrating the environment of a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "source" as used herein in this application refers to a location on a graph representative of a data flow of a computer code through which data is being entered (input) into the process implemented by the computer code.

The term "sink" as used herein in this application refers to a location on a graph representative of data flow of a computer code to which data is directed (target) from one or more sources, along the data paths of the graph. The sink may be an output of the process implemented by the computer code.

The term "tainted" as used herein in this application refers to data that contains at least some data form an external source (such as from a human user). A fully tainted data is data that is purely from an external source and was not passed through a sanitizer. A partially tainted data contains some data from an external source.

The term "string sanitizer" or simply "sanitizer" as used herein in this application refers to an operation carried out by a computer code over an inputted data (such as a string) that renders it compliant with a specified format such as to amend potential security vulnerabilities that may be caused by the raw and un-sanitized data. Exemplary sanitizations may include: adding or subtracting letters to a string, converting some or all the letters of a string into to lower case, omitting various ASCII characters of the string and the like.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating an environment 100 of a system according to some embodiments of the invention. An exemplary environment 100 may include a client computer 10 associated with a display 110 acting as user interface, connected via a network 20 to a server 120 that is configured to receive sets of computer codes 130 that exhibit at least some security vulnerabilities, and generate respective sets of computer codes 140 with the security vulnerabilities automatically amended by placing calls to sanitizers in suitable and preferably optimal locations within the computer code. Environment 100 may represent a software development tool in which a developer may not only analyze the computer code he or she created, but also to automatically fix any detected security vulnerability. It is understood however, that other architectures are possible and the client server configuration is only one many possible options.

Consistent with some embodiment of the present invention, the location in a specific tainted data path is regarded a suitable location for inserting a sanitizer only if one or more operations selected from a predefined list of operations has been applied to the data originating from a source associated with the specific tainted data path. Exemplary operations that do not change the original data from the source may include, for illustrative purposes only, changing lower case letters of the original data to upper case and vice versa.

Figure 2:
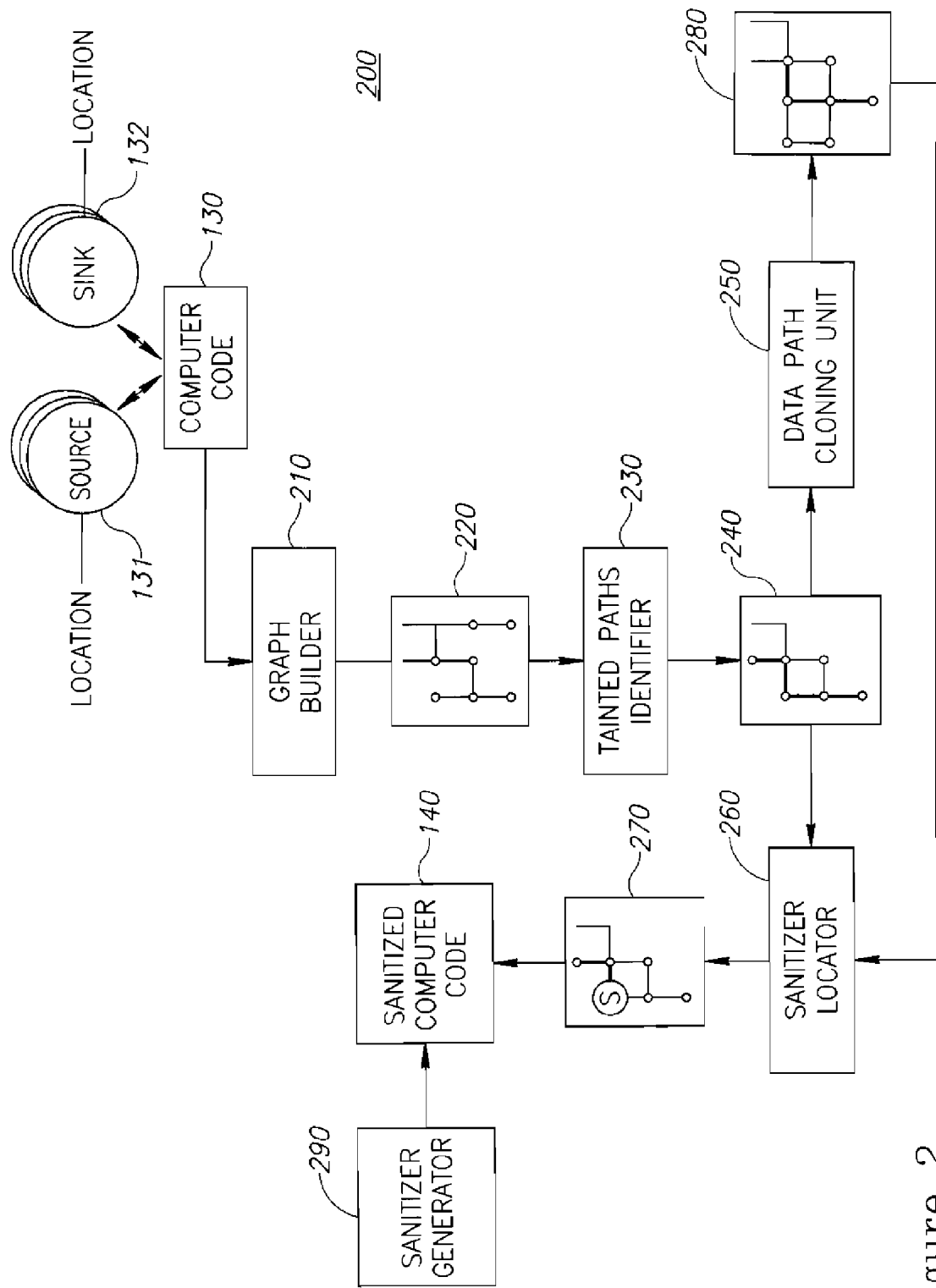
FIG. 2 is a high level schematic block diagram illustrating a system according to some embodiments of the invention.

FIG. 2 is a high level schematic block diagram illustrating in further details an exemplary system 200 implementing embodiments of the invention. System 200 includes a graph builder 210, in operative association with a tainted paths identifier 230 and a sanitizer locator 260. In operation, graph builder 210 is configured to receive a computer code 130 and build a graph 220 that represents at least one of the following: control paths, data paths, and semantic relationships between the control paths and the data paths of computer code 130. In addition, other inputs that are supplied are: one or more sources and one or more sinks with their respective locations 131, 132 on the code. Computer code 130 is of the form that is associated with a data flow of that also includes externally supplied data, from at least one source to at least one sink. Tainted paths identifier 230 is then configured to associate all tainted data paths 240 on graph 220. Tainted paths 240 may be either provided externally to system 200 or alternatively identified on graph 220 using tainted paths identifier 230. Tainted paths are defined herein as the data paths that flow from sources to sinks and do not include a sanitizer. Then, sanitizer locator 260 may be configured to traverse backwards on the identified tainted data paths 240, from sink to source, to determine potential control paths as locations for sanitizer location.

Specifically, sanitizer locator 260 may be configured, in some embodiments, to carry out the following operations: (i) conduct a backward traversal on the tainted data paths 240 from a sink to a source, following all tainted inputs of all computations encountered throughout the tainted path; (ii) mark all points along the tainted path that represent the first value on the data path that is fully tainted which means that it comes directly from a tainted input (pure external source); and (iii) select of all marked points along the data path, the optimal location along a corresponding control path for inserting calls to a sanitizer configured to amend the tainted data. The selected location is typically before the use of the tainted input by the process implemented by the computer code. Practically, the location of the sanitizers can be placed on any control path associated with a data path from a specified fully tainted input to its sink on the tainted paths. However, since sanitizers tend to change the data they are applied to, it is important that sanitizers are located after the tainted data has been used by targets other than the sink associated with the source, but prior to location in which the fully tainted data become partially tainted as the sanitizer then lose its virtues as a sanitizer.

Put differently, potential locations for sanitizer insertions are determined from a plurality of control paths associated with nodes on a tainted path that are: (i) located on or after a direct tainted input and (ii) before a code use of the tainted input.

Consistent with some embodiments of the invention, the determined location for the sanitizer is selected such that it results with minimal addition of code portion. As the call for a sanitizer and the code portion of the sanitizer itself are sometimes affected by their location in the computer code. It would be advantageous to consider, in selecting the exact insertion point for a sanitizer call into a code, the amount of code that is added, so that the amount of added code is minimized or at least—reduced.

Consistent with some embodiments of the invention, system 200 may further include a sanitizer generator 290 configured to generate a corresponding code portion representative of the sanitizer and adding a call to the corresponding code portion at a code location associated with the determined location for the sanitizer. This feature is advantageous as it help automates the sanitizing process: once the sanitizer and their location are automatically determined, the corresponding code portions and the call for the sanitizer are automatically generated and inserted into the computer code.

Consistent with some embodiments of the invention, system 200 may further be arranged to exhibit over a graphical user interface (GUI) on computer display 110 configured to present, in a graphical form, the graph with the tainted paths, control paths, data path and relations between them in a representative format useable for monitoring the location of the sanitizers. As explained above, embodiments of the present invention suggest an automatic process of locating and generating sanitizer calls. However, in some applications, some sort of monitoring the sanitizing process, or an introduction of a semi-automatic process may be advantageous as it enables the developer more control and visibility over the code sanitizing process.

Consistent with some embodiments of the invention, system 200 may further include an optional data path cloning unit 250 configured, where the determined location results in a potential loss of data down the data flow, to clone a data path associated with external data to enable locating a sanitizer farther from the sink. Specifically, in cases where a tainted data needs to be used and the applying of the sanitizer too early may result in erroneous data, a cloning of a data path directed to tainted data can be carried out. Thus, the sanitizer will be located closer to the source and farther from the sink while the un-sanitized tainted data will be cloned and passed to a required location where the necessary operation will be carried out without getting to the sink in an un-sanitized form.

Figure 3:
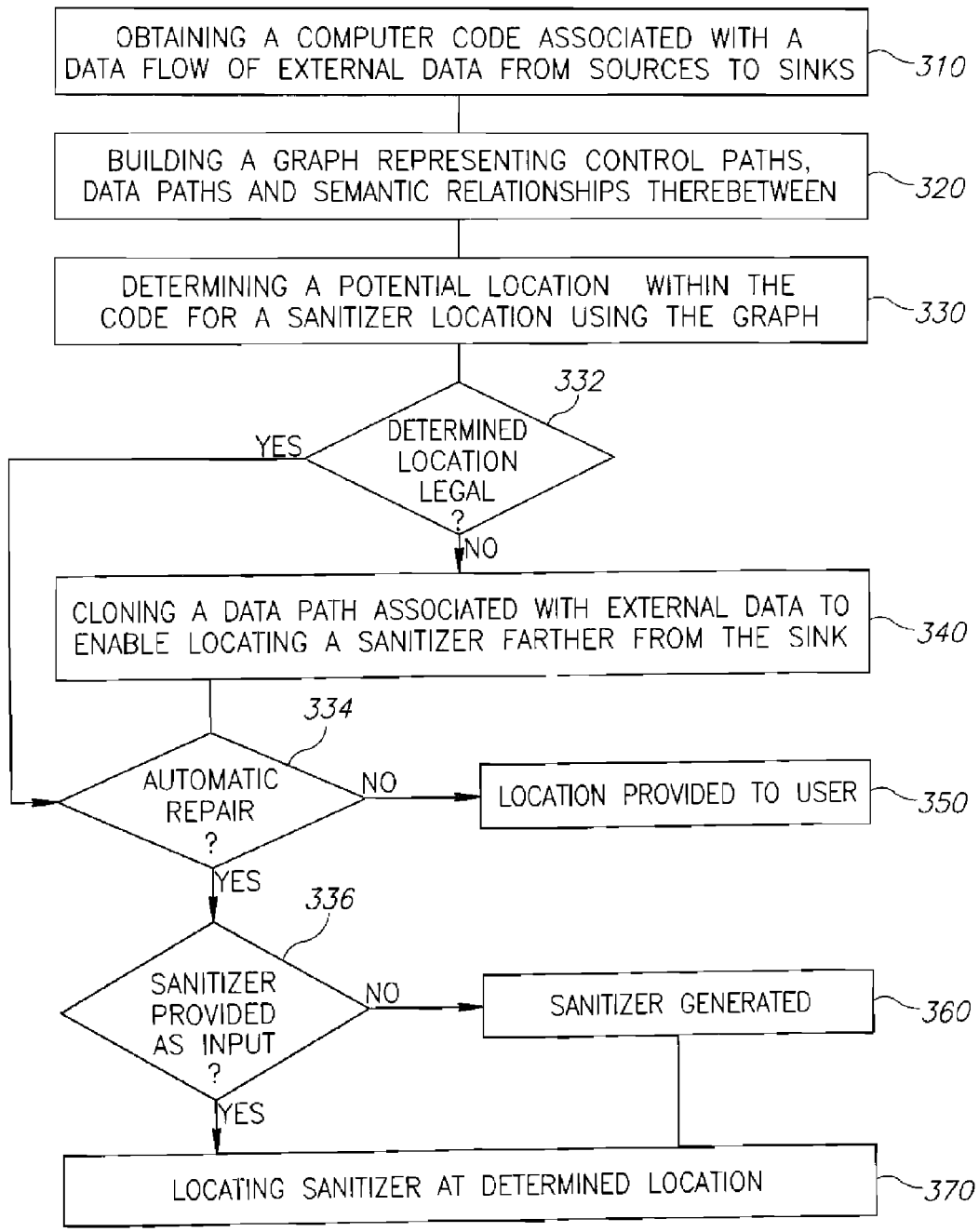
FIG. 3 is a high level flowchart diagram illustrating a method according to some embodiments of the invention.

FIG. 3 is a high level flowchart diagram illustrating a method 300 according to some embodiments of the invention. It is understood that method 300 may be carried out by software or hardware other than the aforementioned architecture of system 200. However, for the sake of simplicity, the discussion of the stages of method 300 is illustrated in conjunction with the components of system 200. Method 300 starts with the stage of obtaining 310 a computer code associated with a data flow of externally supplied data, from at least one source to at least one sink. The method then goes on building 320, possibly using graph builder 210, a graph representing control paths, data paths and semantic relationships between the control paths and the data paths of the computer code. The method then proceed to the stage of identifying 330, using tainted paths identifier 230, all tainted data paths on the graph, being data paths associated with data paths from sources to sinks that do not include a sanitizer. Then, using sanitizer locator 260, the method goes on to the stage of determining 340 a potential location, within the code for sanitizer location, using the graph.

Consistent with some embodiments of the invention, method 300 may further include, in case the determined location is not legal 332 (in the sense that it results with loss of required data), the stage of cloning 350 a data path associated with external data to enable locating a sanitizer farther from the sink.

Consistent with some embodiments of the invention, and in case of an automatic repair 334, and when a sanitizer is not provided as input 336, method 300 may further include the stage of generating 360 a corresponding code portion representative of the sanitizer and adding a call to the corresponding code portion at a code location associated with the determined location for the sanitizer. The generated sanitizer is then inserted into the determined location 370. If the sanitizer was supplied as an input in the obtaining stage, the supplied sanitizers are merely inserted to the determined optimized location in the code, as explained above 370. In case there is no automatic repair 334, the determined location is provided for the user 350 so he or she (or a non human user) may provide and insert the appropriate sanitizer into the determined location.

Consistent with some embodiments of the invention, method 300 may further include the stage of presenting in a graphical form, the graph with the tainted paths, control paths, data path and relations between them in a representative format useable for monitoring the location of the sanitizers.

Figure 5:
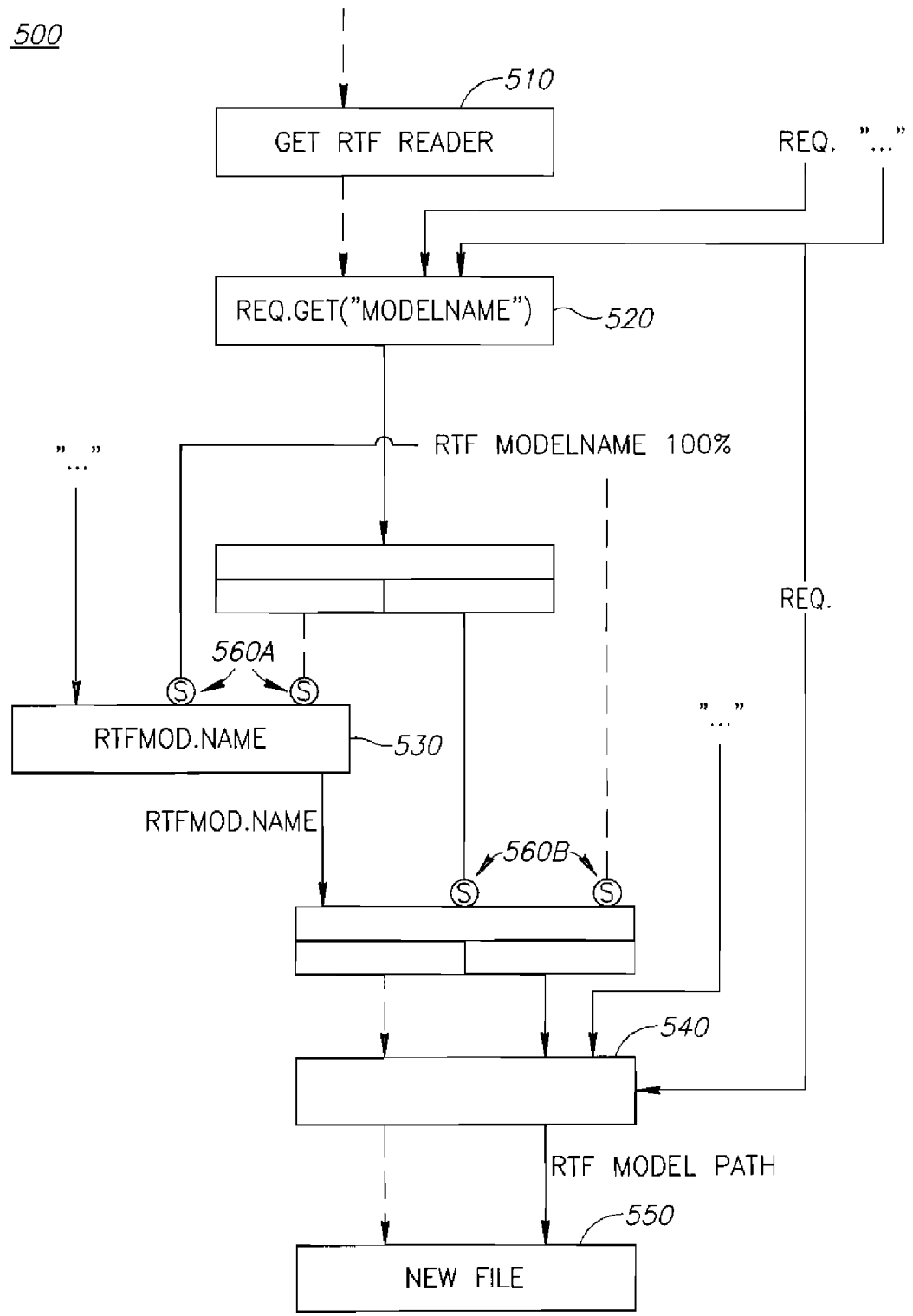
FIG. 5 is a graph diagram associated with the code portions of FIGS. 4A-4C and further illustrating an aspect according to some embodiments of the invention.

FIGS. 4A-4C are exemplary code portions illustrating an aspect according to some embodiments of the invention. FIG. 5 is a graph diagram associated with the code portions of FIGS. 4A-4C and further illustrating an aspect according to some embodiments of the invention. FIG. 4A shows a computer code that exhibits un-sanitized path that may be detected by corresponding graph 500 in FIG. 5. Specifically, graph 500 represents data paths and control paths of computer code 410. In computer code 410, the source 411 is the call to request.getParameter, and the underlined call 414 to File is the target. The tainted data path from source 411 into the target 414 is marked 415, 512, 416, 413, and 414. Specifically, the fully tainted data is marked with 411 and 412, being the first tainted data traversing back from the sink backward to the source, the way the algorithm searches for it. The aforementioned path may be traced using graph 500 showing the source as 520. Traversing on the tainted path backward from target 50 via 540, 530, 520 and 510 shows that either 560A or 560B are the optimal location (or insertion points) for a sanitizer call. The suggested amendment is to replace the fully tainted data of 411 and 412 with an encoded value. FIG. 4B shows how encoded values 421 and 422 are used to replace the fully tinted values, while FIG. 4C shows an alternative call for a sanitizer, in which 431, 432, and 433 replace fully tainted value.

Figure 7:
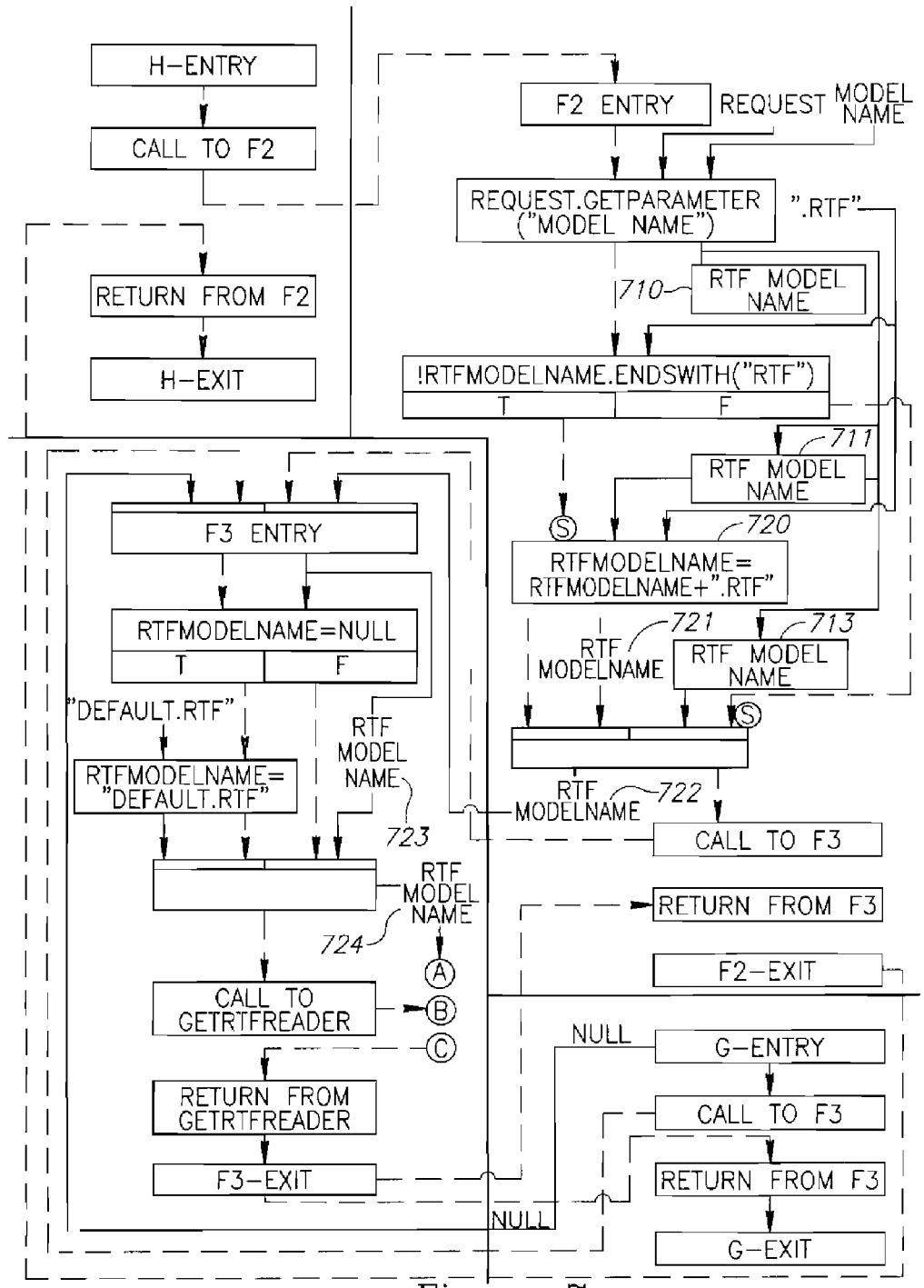
FIG. 7 is a graph diagram associated with the code portions of FIGS. 6A and 6B and further illustrating an aspect according to some embodiments of the invention.
Figure 7:
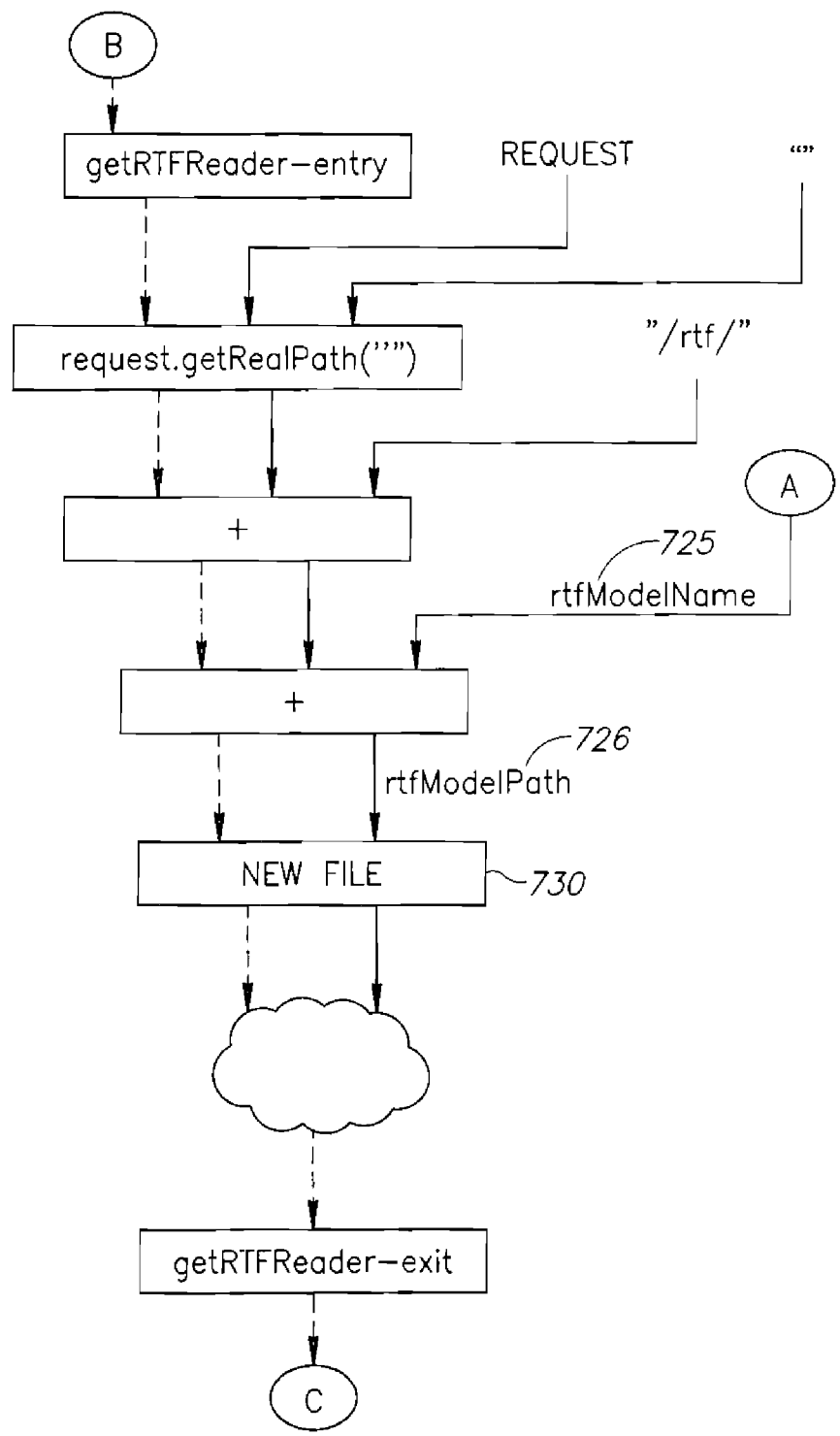

FIGS. 6A and 6B are exemplary code portions illustrating an aspect according to some embodiments of the invention. Similarly, FIG. 7 is a graph diagram associated with the code portions of FIGS. 6A and 6B and further illustrating an aspect according to some embodiments of the invention. As can be shown in computer code 610 and graph 700 the source is the call to request.getParameter 610 and the underlined call to File 619A is the target.

FIG. 6B shows an exemplary fix possible by embodiments of the invention. As shown in graph 700 tainted value is created in f2( ) on the path from h( ) to getRTFReader( ) h( )→f2( )→f3( )→getRTFReader( ). The tainted path being 619A, 619, 618, 617, 616, 615, 614, 613, 612, and 611, wherein the fully tainted values are in 611 and 612.

Amending the code is carried out by adding in 620, two encoded values 621 and 622 that replace the fully tainted values. It is noted that as shown in FIG. 7 the only tainted path is found in f2( ) and therefore, the insertion of a sanitizer is only required there.

It is further noted that the graphs are shown in a specified notation distinguishing between data paths and control paths. Applicants have discovered that the suggested notation is advantageous because it well represents the semantic relations between data paths and control paths. It is noted however that other forms of representations may be used in implementing embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
obtaining: (i) a computer code associated with a data flow of externally supplied data, from one or more sources to one or more sinks, (ii) locations of the sources, and (iii) locations of the sinks;
building a graph representing at least one of: control paths, data paths, and semantic relationships between the control paths and the data paths of the computer code;
associating all tainted data paths on the graph, being data paths that go from sources to sinks and do not include a sanitizer;
determining, on the tainted data paths, locations along the control paths suitable for sanitizer insertion, wherein a suitable location is a location that is associated with data that originates only from the source of respective tainted data paths, and a determined location in a specific tainted data path is regarded as the suitable location for inserting a sanitizer only if one or more operations selected from a predefined list of operations has been applied to data originating from a source associated with the specific tainted data path;
cloning a data path associated with external data to enable locating a sanitizer farther from the sink in a case in which the determined location results in a loss of data,
wherein at least one of: the obtaining, the building, the associating, the determining, and the cloning, is carried out in operative association with at least one processor.

2. The method according to claim 1, wherein the determining is carried out by traversing backwards on the tainted data paths, from the sink to the source and selecting potential locations for sanitizer insertion that optimizes the data flow.

3. The method according to claim 2, wherein in the traversing, potential locations for sanitizer insertions are determined from a plurality of control paths associated with nodes on a tainted path that are: (i) located on or after a direct tainted input and (ii) before all code uses of the input in the tainted path.

4. The method according to claim 1, wherein the determined location for the sanitizer is selected such that it results in minimal addition of code portions.

5. The method according to claim 1, wherein the obtaining further comprises obtaining at least one sanitizer, and wherein the method further comprises locating the obtained sanitizer at the determined location for insertion of the sanitizer.

6. The method according to claim 1, further comprising generating a corresponding code portion implementing the sanitizer and adding a call to the corresponding code portion at a code location associated with the determined location for insertion of the sanitizer.

7. The method according to claim 1, further presenting, in a graphical form, the graph with the tainted paths, control paths, data path and relations between them, in a representative format useable for monitoring the insertion locations for the sanitizers.

8. The method according to claim 1, wherein the cloning is carried out such that the sanitizer insertion minimized addition of code portions to the computer code.

9. A system comprising:
a graph builder configured to:
(a) obtain: (i) a computer code associated with a data flow of externally supplied data, from one or more sources to one or more sinks, (ii) locations of the sources, and (iii) locations of the sinks; and
(b) build a graph representing at least one of: control paths, data paths, and semantic relationships between the control paths and the data paths of the computer code;
a tainted paths identifier configured to associate all tainted data paths on the graph, being data paths that go from sources to sinks and do not include a sanitizer;
a sanitizer locator configured to determine, on the tainted data paths, locations along the control paths that are suitable for sanitizer insertion, wherein a suitable location is a location that is associated with data that originated only from one or more sources of respective tainted data paths, and a determined location in a specific tainted data path is regarded as the suitable location for inserting a sanitizer only if one or more operations selected from a predefined list of operations has been applied to data originating from a source associated with the specific tainted data path; and
a data path cloning unit configured cloning a data path associated with external data to enable locating a sanitizer farther from the sink, in a case the determined location results in a loss of data,
wherein the graph builder, the tainted paths identifier, the sanitizer locator, and the data path cloning unit are stored in a computer memory of the system in operative association with at least one processor.

10. The system according to claim 9, wherein the sanitizer locator is further configured to (i) traverse backwards on the tainted data paths, from the sink to the source and (ii) select potential locations for sanitizer insertion that optimize the data flow.

11. The system according to claim 10, wherein a traversing carried out by the sanitizer locator, potential locations for sanitizer insertions are determined from a plurality of control paths associated with nodes on a tainted path that are: (i) located on or after a direct tainted input and (ii) before all code uses of the input in the tainted path.

12. The system according to claim 9, wherein the determined location for the sanitizer is selected by the sanitizer locator, such that it results in minimal addition of code portions.

13. The system according to claim 9, wherein at least one sanitizer is externally obtained, and wherein the sanitizer locator is further configured to locate the obtained sanitizer at the determined location for insertion of the sanitizer.

14. The system according to claim 9, further comprising a sanitizer generator configured to generate a corresponding code portion implementing the sanitizer and adding a call to the corresponding code portion at a code location associated with the determined location for insertion of the sanitizer.

15. The system according to claim 9, further comprising a user interface configured to present, in a graphical form, the graph with the tainted paths, control paths, data path and relations between them, in a representative format useable for monitoring the insertion locations for the sanitizers.

16. A computer program product, the computer program product comprising:
- a computer memory stored computer readable program, the computer readable program comprising:
- computer readable program configured to obtain: (i) a computer code associated with a data flow of externally supplied data, from one or more sources to one or more sinks, (ii) locations of the sources, and (iii) locations of the sinks;
- computer readable program configured to build a graph representing control paths, data paths and semantic relationships between the control paths and the data paths of the computer code;
- computer readable program configured to identify all tainted data paths on the graph, being data paths that go from sources to sinks and do not include a sanitizer;
- computer readable program configured to determine, on the tainted data paths, potential control paths suitable for locations for sanitizer insertion, wherein a suitable location is a location that is associated with data that originated only from one or more sources of respective tainted data paths, and a determined location in a specific tainted data path is regarded as a suitable location for inserting a sanitizer only if one or more operations selected from a predefined list of operations has been applied to data originating from a source associated with the specific tainted data path; and
- computer readable program configured to clone a data path associated with external data to enable locating a sanitizer farther from the sink, in a case the determined location results in a loss of data.

17. The computer program product according to claim 16, further comprising computer readable program configured to: (i) traverse backwards on the tainted data paths, from the sink to the source and (ii) select potential locations for sanitizer insertion that optimize the data flow.

18. The computer program product according to claim 16, wherein the determined location for the sanitizer is selected, such that it results in minimal addition of code portions.

19. The computer program product according to claim 16, wherein at least one sanitizer is externally obtained, and wherein the computer program product further comprise computer readable program configured to locate the obtained sanitizer at the determined location for insertion of the sanitizer.

20. The computer program product according to claim 16, further comprising computer readable program configured to generate a corresponding code portion implementing the sanitizer and adding a call to the corresponding code portion at a code location associated with the determined location for insertion of the sanitizer.

* * * * *